UNITED STATES PATENT OFFICE.

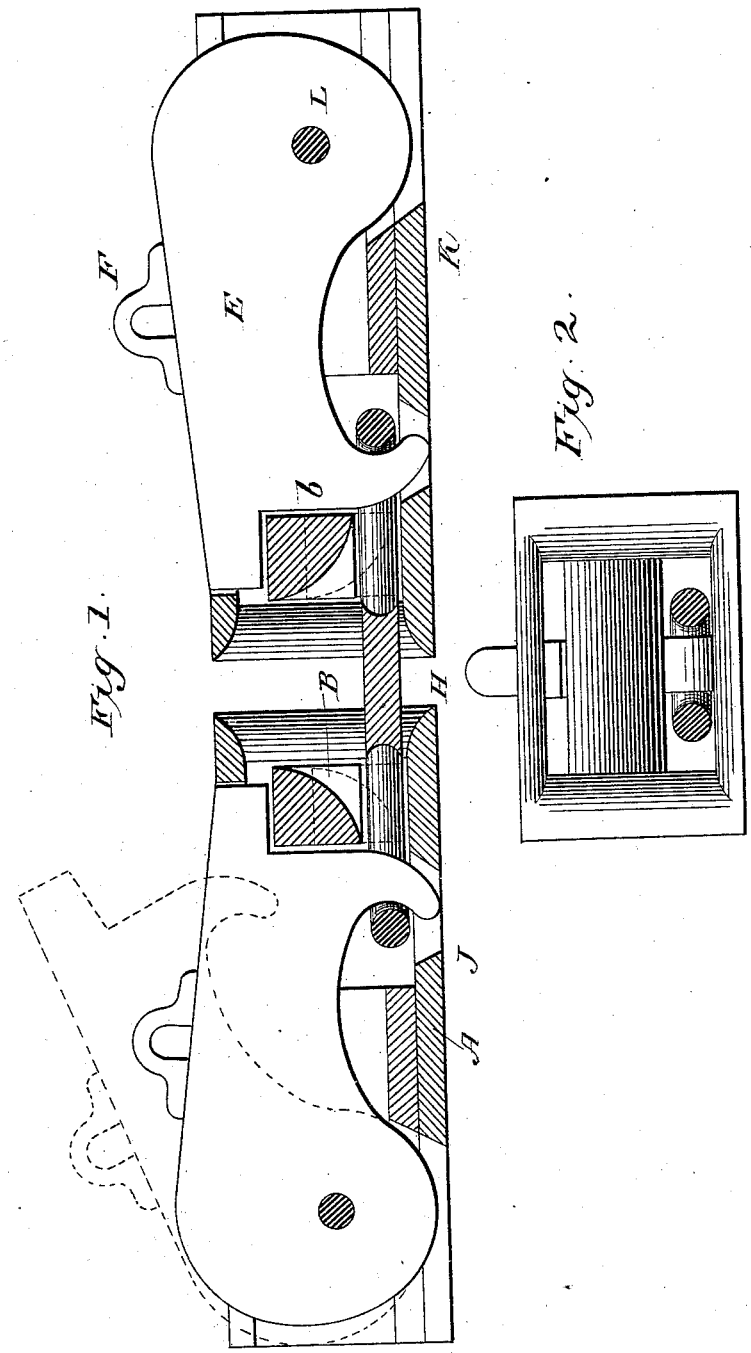

JOHN WOOD, OF COOPERSTOWN, NEW YORK.

CAR-COUPLING.

SPECIFICATION forming part of Letters Patent No. 279,303, dated June 12, 1883.

Application filed April 27, 1883. (No model.)

*To all whom it may concern:*

Be it known that I, JOHN WOOD, a citizen of the United States, residing in Cooperstown, in the county of Otsego and State of New York, have invented a new and Improved Self-Acting Car-Coupling, of which the following is a specification.

Figure 1 is a horizontal view with the top of the draw-head removed. Fig. 2 is a perpendicular view through the center of the draw-head.

Same letters refer to like parts in each of the figures.

A is the draw-head.

B is a sliding block, which moves in grooves in the sides of the draw-head. Said block has an aperture cut through it, and has the central part of the front end beveled, as shown by b, Fig. 2. Said block rests upon the coupling-link to balance and prevent the outer end from falling, and to hold it in position for coupling with the opposite car. The bevel is made on the aforesaid block for the purpose of having it rise when the link strikes against it, and thereby raise the hook, the end of which rests on the block, so the link can pass under and couple.

E is the coupling-hook, which I use instead of a pin. I prefer to make this hook of malleable iron. Said hook is attached to the draw-head near the lower edge (shown by L) for the purpose of preventing it from rising and uncoupling when in use. The upper part of the front end of the hook rests on the block B. The lower part of front is beveled, so the force of the link raises said hook, passes under, and connects.

F is an attachment on the hook by which it is raised to uncouple the cars, which may be done with the hand or by using a small iron rod.

H is the coupling-link, which may be constructed in the usual way or with solid center and clasp around it.

J is a block inside the draw-head, against which the link strikes to prevent said link from going too far into the draw-head; but it must not be so far forward as to prevent the free working of the link or the coming together of the draw-heads.

K, dotted lines, shows openings in the bottom of the draw-head for the hook to operate through and for the escape of wet.

In operating this invention, the link being in one of the draw-heads and the cars brought together, the link first strikes the bevel part of the sliding block B, which causes said block to rise, and thus raise hook E, so the link strikes the beveled part of the hook, raises it, and passes under, when said hook drops into the link, and the cars are coupled.

What I claim as my invention, and desire to secure by Letters Patent, is—

The draw-head A, block B, link H, and hook E, connected with railroad-cars, constructed, combined, and arranged as and for the purpose specified.

JOHN WOOD.

Witnesses:
   EDGAR H. LAKE,
   SAMUEL HARPER.